United States Patent [19]

Morris et al.

[11] Patent Number: 5,576,711
[45] Date of Patent: Nov. 19, 1996

[54] MONOPULSE SIGNAL PROCESSOR AND METHOD USING SAME

[75] Inventors: Randall D. Morris, Medford Lakes, N.J.; Raymond S. Berkowitz, Philadelphia, Pa.

[73] Assignee: Martin Marietta Corporation, Moorestown, N.J.

[21] Appl. No.: 661,795

[22] Filed: Oct. 17, 1984

[51] Int. Cl.$^6$ ................................................. G01S 13/00
[52] U.S. Cl. ........................................................ 342/152
[58] Field of Search ............................. 343/5 NQ, 16 M, 343/427; 364/517; 342/152

[56] References Cited

U.S. PATENT DOCUMENTS

| | | | |
|---|---|---|---|
| 3,740,750 | 6/1973 | Moulton | 342/152 |
| 3,858,036 | 12/1974 | Lundsford | 364/517 |
| 3,958,242 | 5/1976 | Sirven | 342/152 |
| 4,101,889 | 7/1978 | Evans | 343/5 NQ |
| 4,168,500 | 9/1979 | Brassaw | 343/5 NQ |
| 4,219,811 | 8/1980 | Herman et al. | 343/5 NQ |
| 4,219,812 | 8/1980 | Rittenbach | 343/5 NQ |
| 4,219,816 | 8/1980 | Schenkel et al. | 343/5 NQ |
| 4,331,958 | 5/1982 | Lacomme | 342/152 |
| 4,359,735 | 11/1982 | Lewis et al. | 343/5 NQ |
| 4,375,640 | 3/1983 | Harvey | 343/5 NQ |
| 4,488,154 | 12/1984 | Ward | 343/5 NQ |
| 4,527,161 | 7/1985 | Wehner | 342/152 |

FOREIGN PATENT DOCUMENTS

0017532  10/1980  European Pat. Off. ............ 343/16 M

*Primary Examiner*—Salvatore Cangialosi
*Attorney, Agent, or Firm*—W. H. Meise; C. A. Nieves; S. A. Young

[57] ABSTRACT

A monopulse signal processor provides target monopulse ratios and thus target angles having an improved accuracy in those situations where a low signal-to-noise ratio subsists and the monopulse ratio is derived from a sequence of pulses. The monopulse ratio value is determined by:

$$\hat{\rho} = \frac{\beta_T - \alpha_T + \sqrt{(\beta_T - \alpha_T)^2 + 4\gamma_T^2}}{2\gamma_T}$$

where
$$\alpha_T = \sum_{i=1}^{N} \alpha_i,$$
$$\alpha_i = \Sigma_{Ii}^2 + \Sigma_{Qi}^2,$$
$$\beta_T = \sum_{i=1}^{N} \beta_i,$$
$$\beta_i = \Delta_{Ii}^2 + \Delta_{Qi}^2,$$
$$\gamma_T = \sum_{i=1}^{N} \gamma_i,$$
$$\gamma_i = \Sigma_{Ii}\Delta_{Ii} + \Sigma_{Qi}\Delta_{Qi},$$

and $\Sigma_{Ii}$ is the in-phase component of the sum signal for the $i^{th}$ pulse, $\Sigma_{Qi}$ is the quadrature component of the sum signal for the $i^{th}$ pulse, $\Delta_{Ii}$ is the in-phase component of the difference signal for the $i^{th}$ pulse, and $\Delta_{Qi}$ is the quadrature component of the difference signal for the $i^{th}$ pulse.

9 Claims, 5 Drawing Sheets

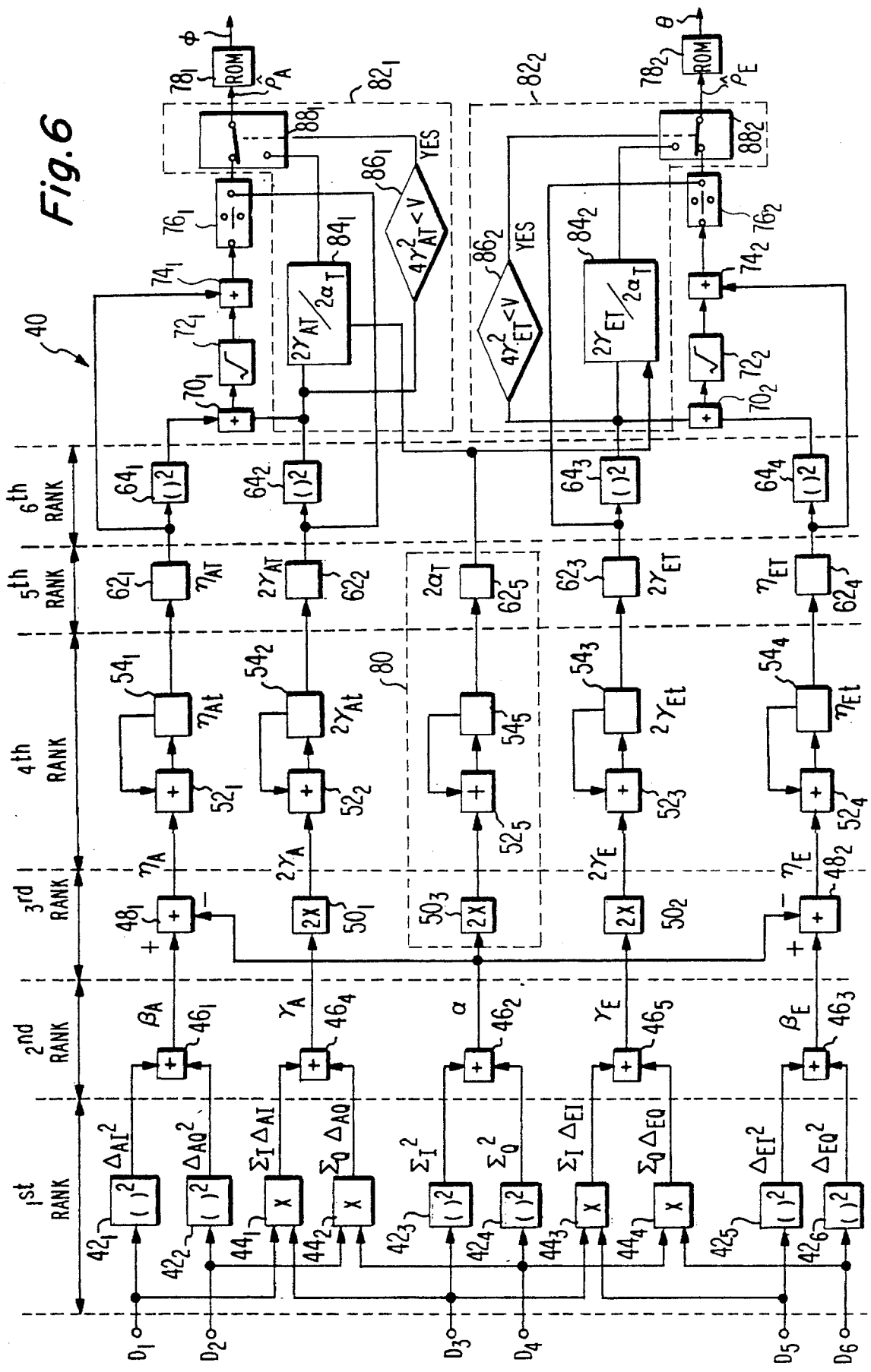

MONOPULSE SIGNAL PROCESSOR AND METHOD USING SAME

The Government has rights in this invention pursuant to Contract No. N00024-81-C-5145, awarded by the Department of the Navy.

The present invention relates to monopulse signal processors and more particularly to monopulse signal processors designed for operation with received signals having low signal-to-noise ratios.

A monopulse signal processing system determines the angle between the receive beam axis of a radio frequency (RF) antenna and a line to the apparent source of a received radio frequency signal. The received RF signal may have come directly from an active transmitter of that signal as in communications and direction finding applications or it may have been passively reflected by the apparent source as in radar applications. In radar applications, the radar system normally transmits the signal which reflects off the passive apparent source or "target". Hereinafter, both active sources and passive, reflecting "apparent" sources are included within the term "source", since the purpose of a monopulse system is to determine the point of origin of the waves impinging on its antenna. Because of the influence of the radar origin of monopulse systems, the signal source is often referred to as a target. "Target" is used as a generic term for all types of sources.

The angle between the receive beam axis and a line to the target is determined from a sum signal ($\Sigma$) and a difference signal ($\Delta$). The sum signal $\Sigma$ is the sum of all the energy reaching the antenna in the operating frequency range of the receiver with possible weighting for sidelobe reduction. The difference signal $\Delta$ is the difference between the signals from the two halves of the antenna, again with possible weighting for sidelobe reduction. Normally, separate azimuth and elevation angle signals are generated by the monopulse signal processor. In order to generate these angle signals there must be a difference signal for the azimuth direction ($\Delta_A$) and another (separate) difference signal for the elevation direction ($\Delta_E$). The angle between a signal source or target and the beam axis in one coordinate is determined from the ratio of the difference signal in that coordinate to the sum signal. This ratio is called the monopulse ratio and is here denoted $\rho$. For the elevation axis the monopulse ratio is denoted $\rho_E$ and for the azimuth axis it is denoted $\rho_A$. The angle between a target and the beam axis is a known function of $\rho$ which is monotonic, depends on the antenna and its sidelobe weighting and possibly which axis and in many systems is close to being a linear function. Once a value of $\rho$ is obtained the corresponding angle may be determined by calculation or by table look up. In those systems in which the function is strictly linear, the target angle is equal to $K\rho$ where K is an antenna system dependent constant. Because the target angle is a known, predetermined function of the monopulse ratio, the performance of the radar is determined by the accuracy with which it determines the monopulse ratio. The present invention is primarily concerned with improvements in the accuracy of the determination of $\rho$ and thus, via conversion of $\rho$ to the corresponding target angle signal with improvements in the accuracy of the target angle signals.

A common (conventional) monopulse ratio is denoted $\hat{\rho}_c$:

$$\hat{\rho}_c = Re\left(\frac{j\Delta}{\Sigma}\right) = \frac{\gamma}{\alpha} \qquad (1)$$

where $\Sigma$ is the sum signal, $\Delta$ is the difference signal, $\gamma = \Sigma_I \Delta_I + \Sigma_Q \Delta_Q$, $\alpha = \Sigma_I^2 + \Sigma_Q^2$, $\Sigma_I$ is the in-phase component of $\Sigma$, $\Sigma_Q$ is the quadrature component of $\Sigma$, $\Delta_I$ is the in-phase component of $\Delta$, and $\Delta_Q$ is the quadrature component of $\Delta$.

This monopulse ratio $\hat{\rho}_c$ is accurately related to the actual target angle value when a monopulse system is operating in the clear with received signals having a large signal-to-noise ratio. "In the clear" means that the system is not being jammed and the received signal (the return signal in a radar system) is largely free of clutter and noise. As the signal-to-noise ratio of the received signal decreases, the accuracy of $\hat{\rho}_c$ decreases because noise signals become a more significant portion of the received signals from which the value $\hat{\rho}_c$ is derived. This reduces the contribution of the desired signal to the measured value of $\hat{\rho}_c$. When the signal-to-noise ratio becomes low enough, a determination of $\hat{\rho}_c$ based on a single received pulse is meaningless because the contribution of the noise signal essentially randomizes the value and any given value has an unknown relationship to the actual target angle. Under such conditions a value is determined from multiple pulses because, as is well-known, averaging over a number of repetitions of a noisy desired signal can produce a representation of that desired signal which is statistically more accurate than a representation based on a single occurrence of the signal. In the prior art such determinations based on multiple pulses have been made in either of two ways: (1) the result $\hat{\rho}_c$ for each pulse has been averaged over the desired number of pulses to provide a value which is the average of the $\hat{\rho}_c$ values; or (2) the values $\gamma$ and $\alpha$ have been averaged separately for the desired number of pulses (yielding average values $\gamma_{ave}$ and $\alpha_{ave}$) and then $\gamma_{ave}$ has been divided by $\alpha_{ave}$ to provide a value $\hat{\rho}_{c_{ave}}$. Averaging a number of single pulse values of $\hat{\rho}_c$ for a desired number of pulses produces a noise estimate. This is because for a low enough signal-to-noise ratio the distribution of values for $\hat{\rho}_c$ does not have a finite variance and therefore the central limit theorem does not apply and averaging does not improve the measured value. Averaging $\gamma$ and $\alpha$ and then dividing reduces the noise in the final result because $\alpha$ and $\gamma$ each have a finite variance and the central limit theorem applies and the average of each of them ($\gamma$ and $\alpha$) individually does converge to a less noisy result. However, that less noisy result is strongly biased. This is because the noise power makes a positive contribution to $\alpha$ but not to $\gamma$. As a result, when $\gamma_{ave}$ is divided by $\alpha_{ave}$ to obtain the multipulse value $\hat{\rho}_{c\ ave}$, that result is smaller than it would have been if no noise were present. This smaller value corresponds to a smaller angle between the target and the beam axis. Thus, this bias is always inward toward the beam axis from the actual location of the signal source. As concern has increased for radar and communication system operation in high noise environments and in the presence of clutter and jamming, a need has developed for an ability to determine the angle of the signal source or target with respect to the beam axis with increased accuracy in response to a received signal having a low signal-to-noise ratio.

SUMMARY

In accordance with the present invention an improved monopulse signal processor is configured to perform processing steps in parallel and to use all of the energy in the received signals in deriving the monopulse ratio for a received signal. This processor is preferably configured to derive each monopulse ratio value from N successive received pulses. The resulting monopulse ratio for a general axis (azimuth or elevation) has the value:

$$\hat{\rho} = \frac{1}{2\gamma_T}(\beta_T - \alpha_T + \sqrt{(\beta_T - \alpha_T)^2 + 4\gamma_T^2}) \quad (2)$$

where $$\alpha_T = \sum_{i=1}^{N} \alpha_i,$$

where $\alpha_i$ is the value of $\alpha$ for the $i^{th}$ pulse, $$\alpha_i = \Sigma_{Ii}^2 + \Sigma_{Qi}^2,$$

$$\beta_T = \sum_{i=1}^{N} \beta_i,$$

where $\beta_i$ is the value of $\beta$ for the $i^{th}$ pulse, $$\beta_i = \Delta_{Ii}^2 + \Delta_{Qi}^2$$

$$\gamma_T = \sum_{i=1}^{N} \gamma_i,$$

where $\gamma_i$ is the value of $\gamma$ for the $i^{th}$ pulse, and $$\gamma_i = \Sigma_{Ii}\Delta_{Ii} + \Sigma_{Qi}\Delta_{Qi}.$$

This value of $\hat{\rho}$ is a maximum likelihood value of the monopulse ratio and hence of the angle between the beam axis and a line to the signal source or target in the plane to which the difference values ($\Delta$) apply and has very little bias.

BRIEF DESCRIPTION OF THE DRAWINGS

FIG. 6 is a flow chart of a manner of processing the signals in the FIG. 5 system.

In FIG. 1 a monopulse receiving antenna 10 has a center 11, an antenna axis which lies along line 12 and a beam axis which lies along the line 13. In many reflector antenna systems the lines 12 and 13 always coincide. In many phased array antennas the lines 12 and 13 only coincide for one beam pointing angle and diverge for all others. A signal source or target 14 lies on a line 16 from the antenna center. As viewed from the antenna center 11, the target 14 is displaced from the beam axis by an azimuth angle $\phi$ and by an elevation angle $\theta$. The angles $\phi$ and $\theta$ are determined in a monopulse radar system by monopulse processing of the sum, azimuth difference and elevation difference signals returned from the target 14. The antenna 10 provides a sum signal ($\Sigma$), an azimuth difference signal ($\Delta_A$) and an elevation difference signal ($\Delta_E$). These signals are coupled to a monopulse signal processing system 30.

Figure 1:
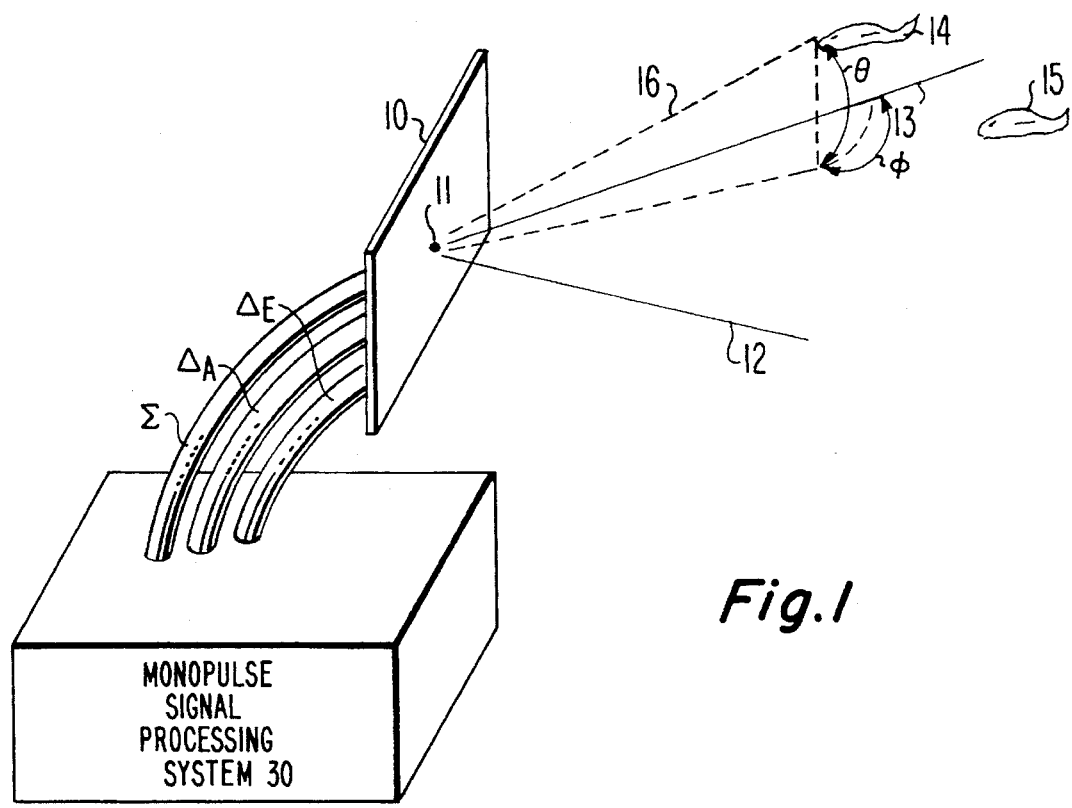
FIG. 1 illustrates the specification of the position of a signal source relative to the antenna beam axis in terms of an elevation angle and an azimuth angle.

The presence of a target somewhere in the antenna beam is determined by a target detection portion of the signal processor. The target detection processor receives and processes the sum beam or sum and difference beams to detect target reflections. The present invention is not directly concerned with the target detection portion of the signal processor. The time elapsed between the emission of the radar pulse and the detection of the reflection from a target provides a measure of the range from the antenna to the target. In order to specify the location of that target, it is necessary to determine the azimuth and elevation angles of the target with respect to the beam axis (the position of the beam axis is known). It is this angle determination aspect of a monopulse system with which the present invention is directly concerned. The azimuth and elevation angles of the location of the detected target (relative to the beam axis) are derived by monopulse processing of the portions of the received beams ($\Sigma$, $\Delta_A$ and $\Delta_E$) which produced the target detection signal.

When the signal-to-noise ratio in the received beam is small, accurate monopulse ratios and thus target location angles can not be determined from a single return pulse. Integration over a number of pulses is desired in order to reduce the effect of the noise contribution to the target angle determinations.

We have determined that the prior art process discussed above at equation 1 is not optimum for this purpose. First, as discussed above, the resulting answer is either noisy or biased. Second, that process does not make use of all of the available target energy in the received signals. In accordance with the present invention, the following monopulse ratio $\hat{\rho}$ makes use of all of the available target energy in the received signals, is successful in reducing the noise level and is unbiased:

$$\hat{\rho} = \frac{(\beta_T - \alpha_T) + \sqrt{(\beta_T - \alpha_T)^2 + 4\gamma_T^2}}{2\gamma_T} \quad (2)$$

where $$\alpha_T = \sum_{i=1}^{N} \alpha_i,$$

where $\alpha_i$ is the value of $\alpha$ for the $i^{th}$ pulse, $$\alpha_i = \Sigma_{Ii}^2 + \Sigma_{Qi}^2,$$

$$\beta_T = \sum_{i=1}^{N} \beta_i,$$

where $\beta_i$ is the value of $\beta$ for the $i^{th}$ pulse, $$\beta_i = \Delta_{Ii}^2 + \Delta_{Qi}^2,$$

$$\gamma_T = \sum_{i=1}^{N} \gamma_i,$$

where $\gamma_i$ is the value of $\gamma$ for the $i^{th}$ pulse, and $$\gamma_i = \Sigma_{Ii}\Delta_{Ii} + \Sigma_{Qi}\Delta_{Qi}.$$

This $\alpha$ and this $\gamma$ have the same definitions as in the prior art estimate $\hat{\rho}_c$. To simplify expression No. 2, ($\beta-\alpha$) is defined as being equal to $\eta$. Expression No. 2 may then be rewritten as:

$$\hat{\rho} = \frac{\eta_T + \sqrt{\eta_T^2 + 4\gamma_T^2}}{2\gamma_T} \quad (3)$$

Physically, α is a measure of the sum beam power, β is a measure of the difference beam power, γ is a measure of the correlation between the sum beam power and the difference beam power and η is a measure of the difference between the power in the difference beam and the power in the sum beam. Thus, the prior art monopulse ratio $\hat{\rho}_c$ is proportional to the correlation of the sum and difference beam powers divided by the sum beam power. The inventive monopulse ratio $\hat{\rho}$ is proportional to the difference between the power in the difference beam and the power in the sum beam divided by the correlation of the sum and difference beam powers ($\eta_T/2\gamma_T$) plus a correction term $$\left( \frac{\sqrt{\eta_T^2 + 4\gamma_T^2}}{2\gamma_T} \right).$$

Figure 2:
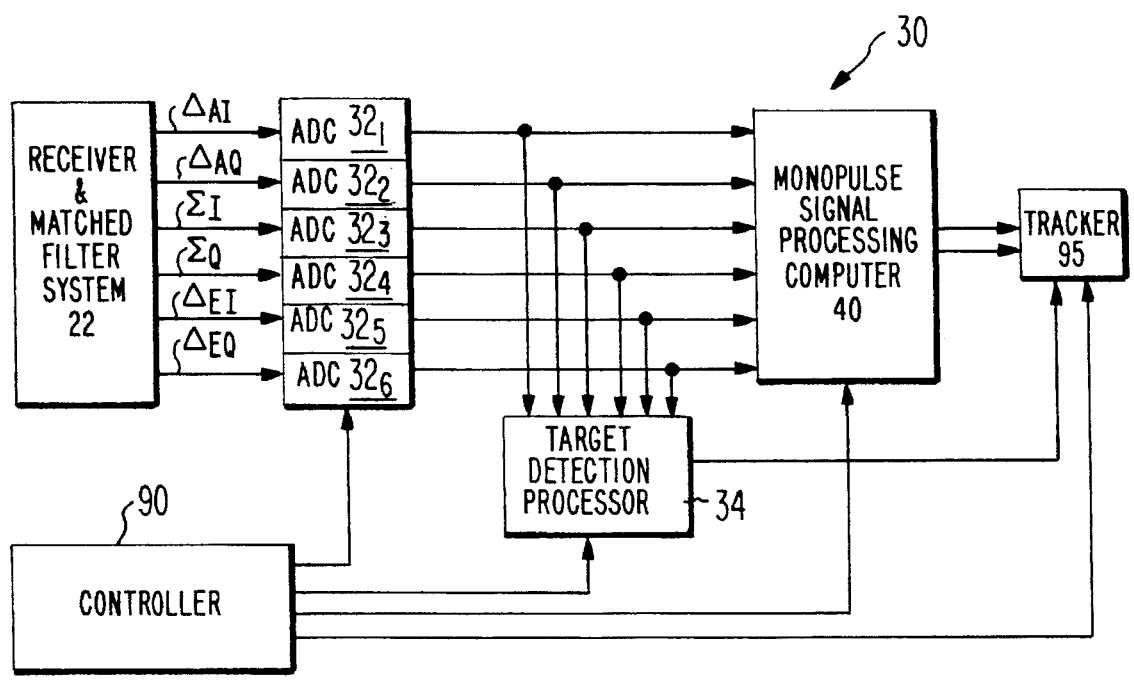
FIG. 2 is a functional block diagram of a signal processor system in accordance with the present invention in which the signals are processed digitally.

A monopulse processing system 30, which in accordance with the present invention provides such a monopulse ratio is illustrated in functional block form in FIG. 2. A signal processor in accordance with this invention may operate in either an analog or digital manner, in accordance with its construction. However, a digital processor is preferred.

The monopulse processing system 30 includes a receiver and matched filter system 22 for correlating the received signal with a transmitted coded signal. Depending on the particular designs employed, the receiver and matched filter may be distinct systems connected in series or portions of the matched filter may be distributed within the receiver. Alternatively, where an uncoded signal is transmitted a receiver without a matched filter may be used. The output from the receiver and matched filter system 22 is six signals. These are the azimuth difference in-phase signal ($\Delta_{AI}$), the azimuth difference quadrature signal ($\Delta_{AQ}$), the sum in-phase signal ($\Sigma_I$), the sum quadrature signal ($\Sigma_Q$), the elevation difference in-phase signal ($\Delta_{EI}$), and the elevation difference quadrature signal ($\Delta_{EQ}$). The six outputs from system 22 are connected to a bank 32 of six analog-to-digital converters (ADCs) $32_1$–$32_6$. In response to timing signals from a controller 90, the bank of A-to-D converters 32 simultaneously converts the amplitude of each of the six signals from the matched filter into six separate binary (digital) values. In a typical system, the bank of A-to-D converters 32 may provide each amplitude in the form of a seven bit magnitude and a sign bit. The resulting eight-bit outputs can range in value from minus 128 to plus 128. Each time the controller activates the A-to-D converters, each of these converters provides a new value at its output and as a group these A-to-D converters together provide a new set of these six values. If digital beam forming is employed in a phased array antenna, then the digital beamformer provides the same six outputs. Those outputs from the digital beamformer are then used in place of the six outputs from the ADCs 32. In either event, the set of six values is provided to a target detection processor 34 for use in determining whether a target is present in the portion of the return signal to which these digital values correspond. The same digital values are also provided to a monopulse signal processing computer 40 which in accordance with the present invention provides as outputs values of φ and θ which are the angles between the line 16 to the target 14 and the antenna beam axis 12 in the azimuth direction and the elevation direction, respectively.

Detection processor 34 determines whether the received values indicate the presence of a target. If they do, then the detection processor 34 provides to tracker 95 a detected-target signal which specifies the range of the target. If they do not, then either no signal or a no-target signal is provided to tracker 95 by detection processor 34.

The monopulse signal processing computer 40 provides a set of target angle signals to tracker 95 for each set of received input values. These target angle signals specify the angle between the beam axis and the target in the event that the processed values include target energy. If tracker 95 receives a detected-target signal in conjunction with a set of the target angle signals, then tracker 95 determines the target position from the known beam position in combination with the determined range and azimuth and elevation target angles. The tracker then determines whether this target location is a newly detected target or is the new position of an old target. If it is a new target, the tracker establishes a new target track to begin following this target. If it is a new position of an old target, then this new position is used to update the track on that old target by providing this new position as the most recent target location. When no detected-target signal or a no-target signal is received in conjunction with a set of target angle signals, tracker 95 discards those angle signals without further processing. Both the target detection processor 34 and the tracker 95 are conventional, the present invention being concerned with the monopulse signal processing computer 40 which converts the received digital values to their corresponding monopulse ratios and then to target angles.

Figure 3:
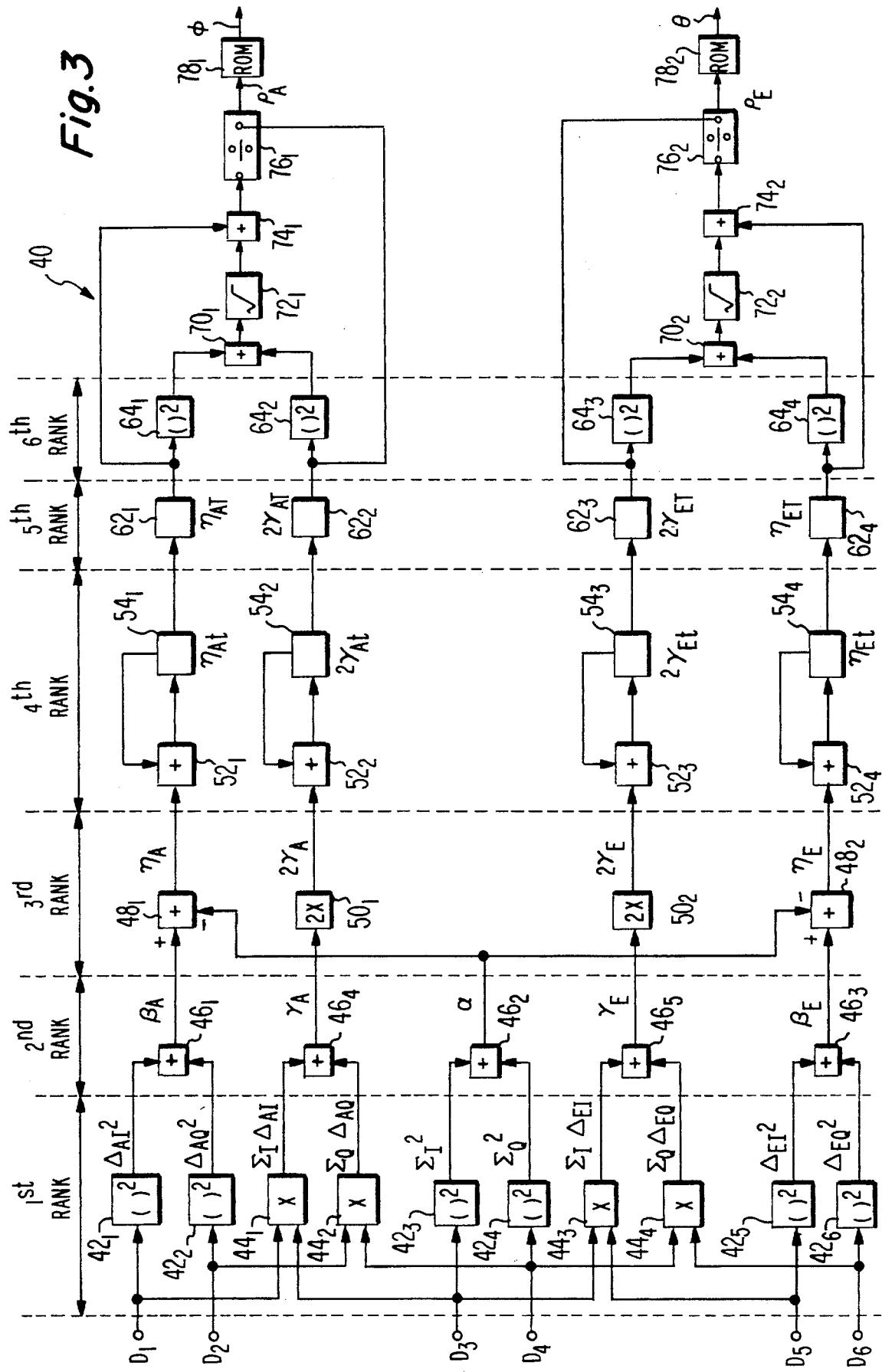
FIG. 3 is a functional block diagram of the signal processing computer included in FIG. 2.

Monopulse signal processing computer 40 is shown in functional block form in FIG. 3. The monopulse processor 40, has six input terminals $D_1$ through $D_6$. Each of these terminals is designed to be connected to receive the output of a corresponding one of the six A-to-D converters $32_1$–$32_6$.

Computer 40 is designed to process data in parallel in order to minimize the time required to derive the monopulse ratios $\hat{\rho}_A$ and $\hat{\rho}_E$ and thus the target angles φ and θ, respectively. To this end, the functional blocks which perform the early steps in data reduction are arranged in successive ranks. The first rank operates on data received from the A-to-D converters 32. Each of the other ranks operates on the output from the previous rank. The operations within a given rank are performed in unison in order that each rank may receive all of its inputs at the same time.

In the configuration illustrated, the input terminal $D_1$ is designed to receive the digitized value of the in-phase azimuth difference signal $\Delta_{AI}$ (from ADC $32_1$), the input terminal $D_2$ is designed to receive the digitized value of the quadrature difference signal $\Delta_{AQ}$ (from ADC $32_2$), the input terminal $D_3$ is designed to receive the digitized value of the in-phase sum signal $\Sigma_I$ (from ADC $32_3$), the input terminal $D_4$ is designed to receive the digitized value of the quadrature sum signal $\Sigma_Q$ (from ADC $32_4$), the input terminal $D_5$ is designed to receive the digitized value of the in-phase elevation difference signal $\Delta_{EI}$ (from ADC $32_5$) and the input terminal $D_6$ is designed to receive the digitized value of the quadrature elevation difference signal $\Delta_{EQ}$ (from ADC $32_6$).

The first rank of processing circuits within processor 40 comprises six squaring circuits or squarers $42_1$–$42_6$ and four two-input multiplying circuits $44_1$–$44_4$. The $D_1$ input ($\Delta_{AI}$) is coupled to the input of the first squarer $42_1$ and to one input of the first multiplier $44_1$. The $D_2$ input ($\Delta_{AQ}$) is coupled to the second squarer $42_2$ and to one input of the second multiplier $44_2$. The $D_3$ input ($\Sigma_I$) is coupled to the input of the third squarer $42_3$, to the other input of the first multiplier $44_1$ and to one input of the third multiplier $44_3$. The $D_4$ input ($\Sigma_Q$) is coupled to the input of the fourth squarer $42_4$, to the other input of the second multiplier $44_2$ and to one input of the fourth multiplier $44_4$. The $D_5$ input ($\Delta_{EI}$) is coupled to the input of the fifth squarer $42_5$ and to the other input of the third multiplier $44_3$. The $D_6$ input ($\Delta_{EQ}$) is coupled to the input of the sixth squarer $42_6$ and to the other input of the fourth multiplier $44_4$.

The second rank of processing circuits within processor 40 comprises five two-input adders $46_1$–$46_5$ configured to receive the ten output values from the first rank processing circuits. The outputs ($\Delta_{AI}^2$ and $\Delta_{AQ}^2$) of the first two squarers $42_1$ and $42_2$ are coupled to the inputs of the first adder $46_1$. The output of adder $46_1$ is a value $\beta_A$, which is equal to $\Delta_{AI}^2+\Delta_{AQ}^2$. The outputs ($\Sigma_I^2$ and $\Sigma_Q^2$) of the third and fourth squarers $42_3$ and $42_4$ are coupled to the inputs of the second adder $46_2$. The output of adder $46_2$ is a value $\alpha$ which is equal to $\Sigma_I^2+\Sigma_Q^2$. The outputs ($\Delta_{EI}^2$ and $\Delta_{EQ}^2$) of the fifth and sixth squarers $42_5$ and $42_6$ are coupled to the inputs of the third adder $46_3$. The output of adder $46_3$ is a value $\beta_E$ which is equal to $\Delta_{EI}^2+\Delta_{EQ}^2$. The outputs ($\Sigma_I\Delta_{AI}$ and $\Sigma_Q\Delta_{AQ}$) of the first two multipliers $44_1$ and $44_2$ are coupled to the inputs of the fourth adder $46_4$. The output of the adder $46_4$ is a value $\gamma_A$ which is equal to $\Sigma_I\Delta_{AI}+\Sigma_Q\Delta_{AQ}$. The outputs ($\Sigma_I\Delta_{EI}$ and $\Sigma_Q\Delta_{EQ}$) of the two multipliers $44_3$ and $44_4$ are coupled to the inputs of the fifth adder $46_5$. The output of adder $46_5$ is a value $\gamma_E$ which is equal to $\Sigma_I\Delta_{EI}+\Sigma_Q\Delta_{EQ}$.

The third rank of processing circuits comprises two two-input adders $48_1$ and $48_2$ and two times-two multipliers $50_1$ and $50_2$. The adders $48_1$ and $48_2$ each complement one input to provide an output which is the difference between their two inputs. The adder $48_1$ has the value $\beta_A$ from adder $46_1$ coupled to its normal or non-complementing input and the value $\alpha$ from adder $46_2$ coupled to its complementing or negative input. The output of the adder $48_1$ is a value $\eta_A$ which is equal to $\beta_A-\alpha$. In a similar manner, the second adder $48_2$ has the value $\beta_E$ coupled to its positive input, and the signal $\alpha$ coupled to its complementing input and provides a value $\eta_E$ equal to $\beta_E-\alpha$ at its output. The first times-two multiplier $50_1$ receives the output of the adder $46_4$ ($\gamma_A$) as its input and provides the value $2\gamma_A$ as its output. In a similar manner, the second times-two multiplier $50_2$ receives the output of the adder $46_5$ as its input and provides the value $2\gamma_E$ as its output.

The first three ranks of processing circuits in the signal processor 30 (extending from the inputs $D_1$–$D_6$ through the adders $48_1$ and $48_2$ and the multipliers $50_1$ and $50_2$) convert each set of six input data values into a corresponding set of four reduced data values ($\eta_A$, $\eta_E$, $2\gamma_A$ and $2\gamma_E$). These reduced data values may be used to determine the monopulse ratios and target angles for the azimuth and elevation directions based on that single set of six input values. However, in accordance with the present invention, it is preferred to accumulate N of these sets of reduced data values and to determine angles based on N of each of them. This accumulation is done in the fourth rank of processing circuits.

The fourth rank of processing circuits comprises four two-input adders $52_1$–$52_4$ and four associated memories $54_1$–$54_4$. Each adder 52 is connected to receive its first input from a first output of its associated memory 54 and to provide its output as an input to that same memory. The second input of adder $52_1$ is connected to receive the output of adder $48_1$. The second input of the adder $52_2$ is connected to receive the output of the multiplier $50_1$. The second input of the adder $52_3$ is connected to receive the output of multiplier $50_2$ and the second input of adder $52_4$ is connected to receive the output of adder $48_2$. The number N of sets of input values over which the reduced data values $\eta_A$, $\eta_E$, $2\gamma_A$ and $2\gamma_E$ are accumulated is determined by the control system 90.

During this accumulation process, the stored value in each of the memories $54_1$–$54_4$ is provided at its first output. Once the $\eta$ and $2\gamma$ values for the final set of inputs to be accumulated in a given accumulation cycle have been included in the values stored in the memories 54, the stored values are provided at the second outputs of the memories 54. The combination of an adder 52 and its associated memory 54 function as an accumulating adder and could be replaced by an accumulating adder. However, that would limit the efficiency of signal processing computer 40 by restricting it to accumulating $\eta$ and $2\gamma$ values for a single range segment per pulse. With the illustrated system, each memory 54 can be provided with as many registers as there are range cells of interest per transmitted pulse. By providing the accumulated value for each range cell from memory 54 to the adder 52 for addition of the new data for that range cell, all range cells of interest can be processed on each pulse. The second output of each memory $54_1$–$54_4$ is coupled to the input of a separate associated memory $62_1$–$62_4$, respectively. The memories 62 comprise the fifth rank of processing circuits. Once the final values for an accumulation cycle have been transferred from the memories 54 to the memories 62, the memories 54 are cleared in preparation for another accumulation cycle. In this specification, the accumulated total values which are stored in the memories 62 are indicated by a "T" as a final subscript. Thus, the value stored in memory $62_1$ is $\eta_{AT}$ which is the accumulated total $\eta$ value for the azimuth beam for the N pulses of interest.

The next (sixth) rank of processing circuits comprises four squarers $64_1$–$64_4$. Each of these is connected to receive the value stored in the corresponding memory 62. The outputs of these four squarers are $\eta_{AT}^2$, $4\gamma_{AT}^2$, $\eta_{ET}^2$ and $4\gamma_{ET}^2$.

Through the sixth rank of processing circuits, values which are subsequently combined in the process of producing the monopulse ratios $\hat{\rho}_A$ and $\hat{\rho}_E$ and target angles $\phi$ and $\theta$ are processed in parallel. From the outputs of the sixth rank (squarers 64) onward the production of each target angle is a serial process. Since the processing of the azimuth signal is identical to the processing of the elevation signal in the serial portion of the process, only the azimuth hardware will be described in detail. The elevation hardware is identical except for the subscripts on its reference numerals which are 2's instead of 1's.

A two-input adder $70_1$ has its inputs connected to receive the outputs of the squarers $64_1$ and $64_2$. The output of this adder is ($\eta_{AT}^2+4\gamma_{AT}^2$) and is connected to the input of a corresponding square root extractor $72_1$. The output of the square root extractor $72_1$ is $\sqrt{\eta_{AT}^2+4\gamma_{AT}^2}$. The output of the square root extractor $72_1$ is connected to the first input of an adder $74_1$ whose other input is connected to receive the value $\eta_{AT}$ from memory $\beta_1$. The output of this adder is $\eta_{AT}+\sqrt{4\gamma_{AT}^2+\eta_{AT}^2}$. The output of the adder $74_1$ is connected to the input of a divider $76_1$ as its dividend. The divisor input of the divider $76_1$ is connected to receive the value $2\gamma_{AT}$ from the memory $62_2$. The output of the divider $76_1$ is the monopulse ratio $\hat{\rho}_A$ for the azimuth direction. The value of $\hat{\rho}_A$ is used as the address for a read only memory (ROM) $78_1$ which provides as its output the azimuth target angle $\phi$ which corresponds to the value of $\hat{\rho}_A$ by which it is addressed. ROM $78_2$ is similar except that it provides as its output the elevation target angle $\theta$ which corresponds to the value of $\hat{\eta}_E$ by which it is addressed. The value stored in the ROM takes into consideration constants for the particular antenna and therefore the same value of $\hat{\rho}$ may result from different target angles for azimuth and elevation.

For speed of processing and to limit the complexity of the hardware for determining these ratios, it is preferred to do complicated (time consuming) computations by table look up rather than by direct computation. This produces much faster processing than doing the actual calculations for each input value and is facilitated by the limited number of bits in the digital outputs of the ADCs 32.

At each stage in the processing where the number of bits in the answer is a substantial increase over the number of bits in the input such as occurs in squaring and in multiplying numbers, it is preferred, in order to minimize the complexity of the following circuitry, to truncate the answers at a number of bits which provide the required degree of accuracy without carrying unneeded bits. Thus, rather than carrying 16 bit answers into the second rank adders, it is preferred to only carry 8-bit answers. Such truncation has a significant effect on the size of the table look up system which is used as the squarer 64. In a similar manner, the outputs of the squarers 64 are preferably truncated to retain only the number of bits necessary to obtain the required degree of resolution. This is done by only storing that number of bits in the ROM which is used to provide these table look up values. The square root extractors 72 are again implemented in a table look-up form. The dividers 76 may be implemented in a table look up form where the addressing of the table requires two indices, one being the divisor, $2\gamma_T$ and the other being the dividend ($\eta_T + \sqrt{4\gamma_T^2 + \eta_T^2}$). The number of bits in the estimate of $\hat{\rho}$ depends on the maximum angle resolution desired. An 8-bit value for $\hat{\rho}$ provides adequate resolution for many systems.

It will be understood that in accordance with the processing capabilities of the signal processing computer, the functions of several elements such as adders or memories may be provided by a single element in the signal processor.

Figure 4:
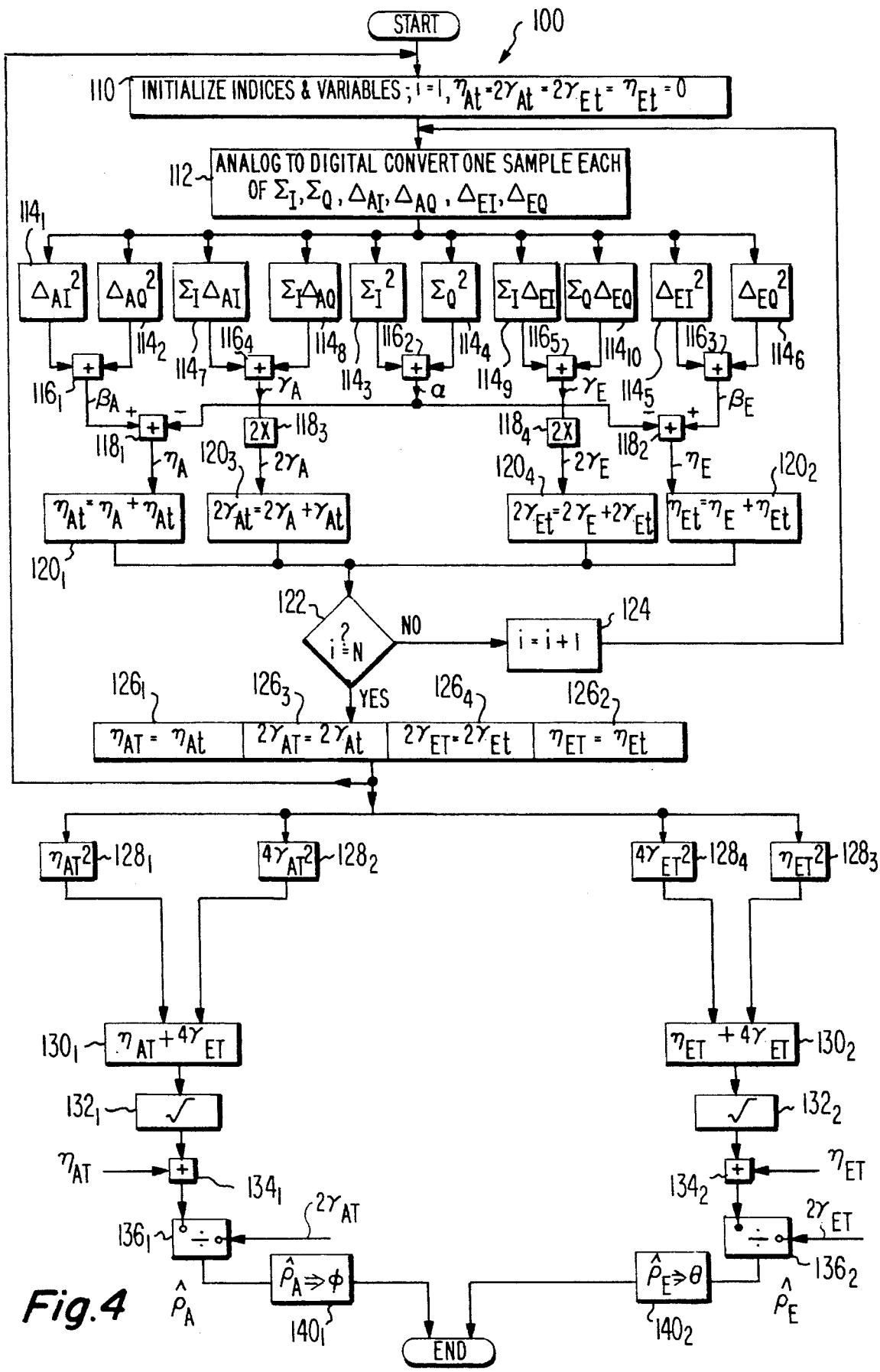
FIG. 4 is a flow chart of a preferred manner of processing the signals in the FIG. 3 system.

A flow diagram 100 of the preferred process in the monopulse signal processing system 30 is illustrated in FIG. 4. The signal processing of a set of N pulses begins in step 110 with the initialization of the indices and resetting of the values of $\eta_{AT}$, $2\gamma_{At}$, $\eta_{Et}$ and $2\gamma_{Et}$ to zero. That is, the contents of the memories 54 in FIG. 3 are set to 0. The index i ranges from 1 to N and is the number of the pulse currently being processed within a group of N pulses. The value of i is reset to 1 each time a new group of N pulses is to be collected. The $\eta_{AT}$, $2\gamma_{At}$, $\eta_{Et}$ and $2\gamma_{Et}$ are the values currently in the memories 54 at any time in the process. In step 112 a sample of each of the signals from the matched filter is converted to a digital value. These values are coupled into the processor 40 as the inputs $D_1$–$D_6$. In step 114, ten substeps $114_1$–$114_{10}$ take place simultaneously in the first rank of hardware of FIG. 3. Step $114_1$ derives the square of the first input which is $(\Delta_{AI})^2$. Step $114_2$ derives the square of the second input which is $(\Delta_{AQ})^2$. Step $114_3$ derives the square of the third input which is $(\Sigma_I)^2$. Step $114_4$ derives the square of the fourth input which is $(\Sigma_Q)^2$. Step $114_5$ derives the square of the fifth input which is $(\Delta_{EI})^2$. Step $114_6$ derives the square of the sixth input which is $(\Delta_{EQ})^2$. Simultaneously, step $114_7$ derives the product of the first input value times the third input value which is $\Delta_{AI}\Sigma_I$, step $114_8$ derives the product of the second and fourth input values which is $\Delta_{AQ}\Sigma_Q$, step $114_9$ derives the product of the third input times the fifth input which is $\Sigma_I\Delta_{EI}$, and step $114_{10}$ derives the product of the fourth input times the sixth input which is $\Sigma_Q\Delta_{EQ}$.

In step 116 five substeps $116_1$–$116_5$ take place simultaneously. Each of these substeps is an addition step which adds together two of the results of the steps 114. Step $116_1$ adds the results of the steps $114_1$ and $114_2$ to produce an output $\beta_A$ which is $(\Delta_{AI}^2 + \Delta_{AQ}^2)$, step $116_2$ operates on the results of steps $114_3$ and $114_4$ to produce an output $\alpha$ equal to $(\Sigma_I^2 + \Sigma_Q^2)$ and step $116_3$ operates on the results of the steps $114_5$ and $114_6$ to produce an output $\beta_E$ which is $(\Delta_{EI}^2 + \Delta_{EQ}^2)$. Simultaneously step $116_4$ operates on the results of steps $114_7$ and $114_8$ to produce the signal $\gamma_A$ which is equal to $(\Delta_{AI}\Sigma_I + \Delta_{AQ}\Sigma)$. Step $116_5$ combines the results of steps $114_9$ and $114_{10}$ to produce the signal $\gamma_E$ which is $(\Sigma_I\Delta_{EI} + \Sigma_Q\Delta_{EQ})$.

In step 118 four sub-steps $118_1$–$118_4$ take place simultaneously. In sub-step $118_1$ the result of step $116_2$ is subtracted from the result of step $116_1$ to produce the value $\eta_A$ which is equal to $(\beta_A - \alpha)$. In step $118_2$ the result of step $116_2$ is subtracted from the result of step $116_3$ to produce the value $\eta_E$ which is equal to $(\beta_E - \alpha)$. In sub-step $118_3$ the result of step $116_4$ is multiplied by 2 to yield the value $2\gamma_A$ and in step $118_4$ the result of sub-step $116_5$ is multiplied by 2 to produce the value $2\gamma_E$.

In step 120, four additions take place simultaneously. In step $120_1$ the result of step $118_1$ is added to the stored value of $\eta_{At}$. On the first cycle, that previously stored value is zero as the result of the initialization performed in step 110. In step $120_2$ the result of step $118_2$ is added to the stored value of $\eta_{Et}$. In step $120_3$ the result of step $118_3$ is added to the accumulated value of $2\gamma_{AT}$ and in step $120_4$ the result of step $118_4$ is added to the accumulated value of $2\gamma_{Et}$.

In step 122 the value of the index i is compared with N (the number of pulses over which the data is to be accumulated). If i is not equal to N, then the process proceeds to step 124 which increments i by 1. From step 124 the process returns to step 112 to convert another sample of each of the six input signals to digital values to be processed through steps 114–122. If in step 122, i is found to be equal to N, then the process proceeds to step 126.

In step 126 the accumulated values of the variables $\eta_{At}$, $2\gamma_{At}$, $\eta_{Et}$ and $2\gamma_{Et}$ are transferred to storage in the memories 62 of FIG. 3 in the four substeps $126_1$–$126_4$. The process then branches to flow in two separate portions simultaneously. The first of these branches returns the data accumulation portion of the process to step 110 which initializes that portion of the process by setting i equal to 1 and resetting the values of $\eta_{At}$, $2\gamma_{At}$, $\eta_{Et}$ and $2\gamma_{Et}$ to zero. The other branch proceeds by further processing the accumulated values which were stored in step 126. In step 128 each of the four values which were stored in step 126 is squared in a different one of the substeps $128_1$–$128_4$. The squaring of the two azimuth values takes place in steps $128_1$ and $128_2$ while the squaring of the elevation values takes place in steps $128_3$ and $128_4$. In step $130_1$ the results of steps $128_1$ and $128_2$ are added together to produce the value $(4\gamma_{AT}^2 + \eta_{AT}^2)$. Simultaneously in step $130_2$ the results of steps $128_3$ and $128_4$ are added together to produce the result $(4\gamma_{ET}^2 + \eta_{ET}^2)$. In steps $132_1$ and $132_2$ the square root of the result of the corresponding addition step 130 is extracted. In step $134_1$ this result is added to the $\eta_{AT}$ value which is derived from the memory $62_1$ to yield a value $\eta_{AT} + \sqrt{4\gamma_{AT}^2 + \eta_{AT}^2}$. In step $136_1$ the result of the addition of step $134_1$ is divided by the value $2\gamma_{AT}$ which is derived from the storage register $62_2$. The result of the division step $136_1$ is the value $\hat{\rho}_A$ which is the azimuth monopulse ratio. In step $140_1$, the azimuth angle $\phi$ between the beam axis and the target for this set of N pulses is derived from a lookup table using $\hat{\rho}_A$ or from a direct calculation using scale factors and powers of $\hat{\rho}_A$. This may be accomplished by a ROM addressed by the value of $\hat{\rho}_A$. This completes the process of deriving the angle $\phi$. Steps $134_2$, $136_2$ and $140_2$ are similar to steps $134_1$, $136_1$ and $140_1$, except for operating on elevation data rather than azimuth data and providing the elevation angle θ.

As was explained previously, the resulting θ and φ values are passed to the tracking system 95 to update the track on the target. This process continues as long as the target continues to be detected and to be within the area of interest. Upon completion of the calculations for the accumulated series of pulses the angles φ and θ to the target in the azimuth and elevation coordinates, respectively are provided to tracker 95. Detection processor 34 provides the range of this target to tracker 95, if processor 34 has detected a target.

In accordance with the processing power of the computer in which this digital processing is performed, the location of a number of distinct targets or signal sources may be determined simultaneously. Thus, the angle of a second target or signal source 15 in FIG. 1 at a different (greater) range may be determined simultaneously in accordance with the time of return of the data used in determining the position of each of the targets or signal sources.

The inventive process provides accurate target angle information both for steady targets and fluctuating targets so long as the signal return level is adequate for the integration process to separate the desired signal from noise. This inventive process provides an accurate target location when it is derived from a single pulse even though its equation (Equation 2) does not reduce to the prior art single pulse formulation (Equation 1). However, the primary benefit of this inventive process is in the processing of a number of low signal-to-noise pulses to provide an integrated angle value since this value is more accurate than the conventional value.

In the prior art angle estimate $\hat{\rho}_c=\gamma/\alpha$, the numerator of the fraction goes to zero for targets on the beam axis but the denominator does not. The sign of $\hat{\rho}_c$ changes as a target crosses the axis. In the present process the sign of the estimate also changes on crossing the beam axis. The present process tends toward a division of zero by zero for targets near the beam axis because both the numerator and the denominator go to zero. This condition can be tested for prior to performing the division operation. When the quotient of the division becomes large due to division by too small a divisor and a target has been detected, that target may be declared to be on the beam axis for the coordinate (azimuth or elevation) in question. It is because of the problem of division by too small a number that the division operation 136 is preferably performed as the final step in the derivation of the value of $\hat{\rho}$. This enables a direct comparison of the values of the divisor and dividend to be used to determine the presence of an on-axis target.

There are alternatives to setting the ratio to zero when $2\gamma_T$ is too small. Under some circumstances depending on the number of pulses (N) being processed and the signal-to-noise ratio, the conventional estimate is more accurate for very small angles. Therefore, one alternative is to establish a threshold value V and provide that $\hat{\rho}$ is set to $\gamma_T/\alpha_T$ whenever $4\gamma_T^2<V$. The value of V may be chosen to be 4 or 16 where seven bit data values ranging from −128 to +128 are provided as inputs to monopulse processing computer 40. Processing for this alternative can be in accordance with modified versions of any of the methods already described.

Figure 5:
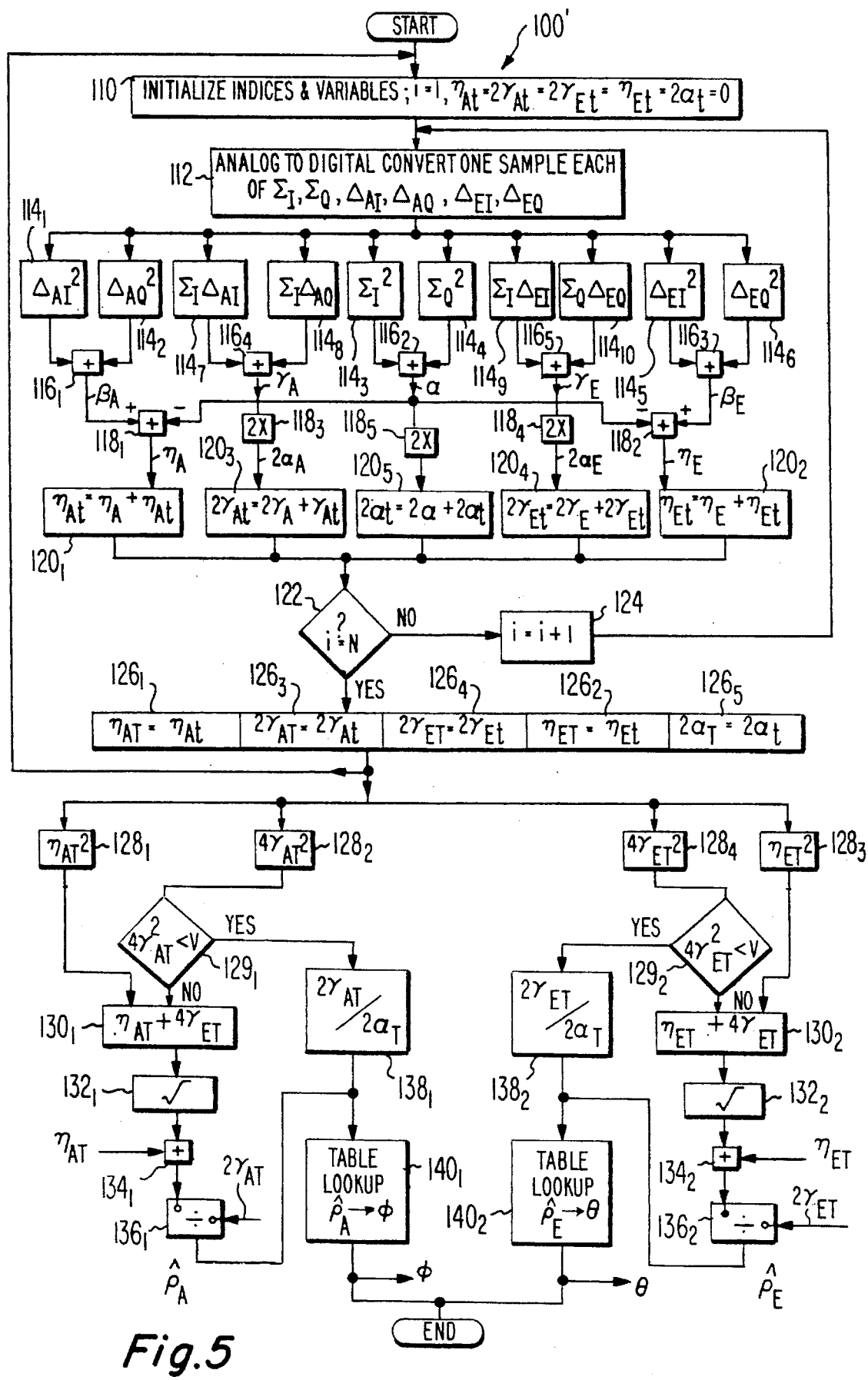
FIG. 5 is a functional block diagram of an alternative configuration for the signal processing computer.

FIG. 5 is similar to FIG. 4 in steps 110; 112; 114; 116; $118_1$–$118_4$; $120_1$–$120_4$; 122; 124; $126_1$–$126_4$; $128_1$–$128_4$. In addition, FIG. 4 includes a step $118_5$ in which α is multiplied by two to produce the value 2α. In step $120_5$ 2α is set equal to $2\alpha_t+2_\alpha$ in order to provide an accumulated value of $2\alpha_t$. When the N pulses have accumulated step $126_5$ sets $2\alpha_T$ equal to $2\alpha_t$ and stores that value of $2\alpha_T$. Step $129_1$ determines whether step $138_1$ or steps $130_1$, $132_1$, $134_1$ and $136_1$ are performed. If in step $129_1$ $4\gamma_{AT}^2 \geq V$, then steps $130_1$, $132_1$, $134_1$ and $136_1$ are performed and step $138_1$ is not performed. If $4\gamma_{AT}^2<V$ then step $138_1$ is performed and steps $130_1$, $132_1$, $134_1$ and $136_1$ are not performed. Step $138_1$ divides the stored value $2\gamma_{AT}$ by the stored value $2\alpha_T$ and the resultant value is the monopulse ratio $\hat{\rho}_A$. Steps $129_2$, $130_2$, $132_2$, $134_2$, $136_2$ and $138_2$ are similar except for operating on elevation data rather than azimuth data. In each case the corresponding step 140 converts the value of $\hat{\rho}$ to the corresponding target angle.

FIG. 6 illustrates a modified version 40' of the monopulse signal processing computer 40 which is suitable for running the modified process 100'. Processor 40' is like processor 40 except for the addition of hardware 80 for processing the α values to obtain a value $2\alpha_T$ and the addition of hardware $82_1$ and $82_2$ for checking the threshold condition for the azimuth and elevation channels respectively and providing the value $$\hat{\rho} = \frac{2\gamma_T}{2\alpha_T}$$

when the value of $4\gamma_T^2$ for a channel is less than the threshold value V.

The threshold condition hardware $82_1$ comprises a divider $84_1$ for dividing the stored value $2\gamma_{AT}$ by the value $2\alpha_T$ to produce the conventional angle estimate $\hat{\rho}_c=\gamma/\alpha$, and a comparator $86_1$ and a switch $88_1$ for controlling whether the estimate $\hat{\rho}_A$ from divider $76_1$ or the estimate $\hat{\rho}_c$ from divider $84_1$ is provided at the output terminal. The hardware $82_2$ is identical hardware $82_1$ except for the subscripts on the reference numerals.

What is claimed is:

1. In a monopulse signal processing system of the type which receives an in-phase difference signal ($\Delta_I$) and a quadrature difference signal ($\Delta_Q$) in a first coordinate and an in-phase sum signal ($\Sigma_I$) and a quadrature sum signal ($\Sigma_Q$), all derived from an antenna system and which provides target tracking information with respect to a target which is a source of at least some of the energy in said received signals and in the process converts each of said received signals to a series of digital signals, each representative of an instantaneous amplitude of that received signal and derives from those digital signals a first monopulse ratio signal which corresponds to the angle in said first coordinate between the receive beam axis of said antenna system and a line to said target, and said system is of the type which includes means responsive to said $\Sigma_I$ and $\Sigma_Q$ digital signals for providing a digital signal α which is the sum of their squares ($\Sigma_I^2+\Sigma_Q^2$), means responsive to said $\Sigma_I$, $\Sigma_Q$, $\Delta_I$ and $\Delta_Q$ digital signals for providing a digital signal γ which is the sum of the product of said $\Sigma_I$ and $\Delta_I$ signals and the product of said $\Sigma_Q$ and $\Delta_Q$ signals ($\Sigma_I\Delta_I+\Sigma_Q\Delta_Q$), the improvement comprising:

means responsive to said $\Delta_I$ and $\Delta_Q$ digital signals for providing a digital signal β which is the sum of their squares ($\Delta_I^2+\Delta_Q^2$); and means for deriving said first monopulse ratio signal from said α, β and γ digital signals.

2. The improvement recited in claim 1 wherein said means for deriving includes:

means responsive to said α and β digital signals for providing a digital signal η which is their difference (β−α);

means responsive to said η signal for providing a signal $\eta^2$;

means responsive to said $\gamma$ digital signal for providing a digital signal $2\gamma$ and a digital signal $4\gamma^2$;

means responsive to said $\eta^2$ and $4\gamma^2$ digital signals for providing a digital signal which is the square root of their sum ($\sqrt{\eta^2+4\gamma^2}$);

means responsive to said $\sqrt{\eta^2+4\gamma^2}$ digital signal and said $\eta$ digital signal for providing a digital signal which is their sum ($\eta+\sqrt{\eta^2+4\gamma^2}$); and means responsive to said ($\eta+\sqrt{\eta^2+4\gamma^2}$) digital signal and said $2\gamma$ digital signal for providing a digital signal $\hat{\rho}$ whose value is ($\eta+\sqrt{\eta^2+4\gamma^2}$) divided by $2\gamma$, said $\hat{\rho}$ signal being provided as said first monopulse ratio signal.

3. The improvement recited in claim 2 wherein:

said means responsive to said $\eta$ signal comprises a first accumulating adder means responsive to said $\eta$ signal for each of N pulses for providing a signal $\eta_T$ which is their sum;

said means responsive to said $\gamma$ signal comprises a second accumulating adder means responsive to said $2\gamma$ signal for each of said N pulses for providing a signal $\gamma_T$ which is their sum, whereby said target angle signal depends on the received signals from said N pulses.

4. The improvement recited in claim 3 wherein said processing system also includes:

means for converting said monopulse ratio signal into a target angle signal specifying said corresponding angle.

5. The improvement recited in claim 2 wherein said processing system also includes:

means for receiving in-phase and quadrature difference signals in a second co-ordinate;

means responsive to said second co-ordinate signals for deriving a second monopulse ratio signal, which corresponds to the angle in said second co-ordinate between said receive beam axis and said line to said target; and means for providing said second monopulse ratio signal at an output.

6. The improvement recited in claim 2 further comprising means for comparing said $4\gamma^2$ signal with a threshold value and means for providing a monopulse ratio signal equal to $\frac{1}{\alpha}$ whenever said $4\gamma^2$ signal is less than said threshold value.

7. A monopulse method of processing received radio signals to provide a signal $\hat{\rho}$ which is a measure of the angle in a first coordinate between the receive beam axis of an antenna and a line to a target from which the antenna receives energy, said method comprising the steps of:

(a) processing signals received from said antenna to provide digital signals representative of the instantaneous amplitudes of in-phase and quadrature difference signals ($\Delta_I$ and $\Delta_Q$, respectively) in said first coordinate and in-phase and quadrature sum signals ($\Sigma_I$ and $\Sigma_Q$, respectively);

(b) squaring said $\Sigma_I$, $\Sigma_Q$, $\Delta_I$ and $\Delta_Q$ signals and adding them to provide a digital signal $\eta$ equal to $\Delta_I^2+\Delta_Q^2-\Sigma_I^2-\Sigma_Q^2$;

(c) multiplying said $\Sigma_I$ signal by 2 times said $\Delta_I$ signal and said $\Sigma_Q$ signal by 2 times said $\Delta_Q$ signal and adding them to provide a digital signal $2\gamma$ equal to $2\Sigma_I\Delta_I+2\Sigma_Q\Delta_Q$; and (d) squaring said $\eta$ and $2\gamma$ signals and adding them to provide a signal equal to $\sqrt{\eta^2+4\gamma^2}$; and (e) extracting the square root $\sqrt{\eta^2+4\gamma^2}$ (f) adding $\eta$ to said square root and dividing by $2\gamma$ to provide a signal equal to $$\frac{\eta+\sqrt{\eta^2+4\gamma^2}}{2\gamma}$$

as said $\hat{\rho}$ signal.

8. The method recited in claim 7 further comprising performing the following steps prior to step (d):

(g) accumulating a sum of the signals $\eta$ from each of N received pulses; and (h) accumulating a sum of the signals $2\gamma$ from each of said N received pulses whereby the signal $\hat{\rho}$ depends on said N received pulses.

9. The method recited in claim 7 further comprising the steps of:

comparing the $4\gamma^2$ signal with a threshold value; and providing as said $\hat{\rho}$ signal the value $\frac{1}{\alpha}$ when $4\gamma^2$ is less than said threshold value.

* * * * *